(12) United States Patent
Eronen et al.

(10) Patent No.: US 11,140,508 B2
(45) Date of Patent: Oct. 5, 2021

(54) APPARATUS AND ASSOCIATED METHODS FOR AUDIO PRESENTED AS SPATIAL AUDIO

(71) Applicant: Nokia Technologies Oy, Espoo (FI)

(72) Inventors: Antti Eronen, Tampere (FI); Adriana Vasilache, Tampere (FI); Henri Toukomaa, Tampere (FI); Kari Juhani Järvinen, Tampere (FI); Sujeet Shyamsundar Mate, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/620,142

(22) PCT Filed: Jun. 11, 2018

(86) PCT No.: PCT/FI2018/050431
§ 371 (c)(1),
(2) Date: Dec. 6, 2019

(87) PCT Pub. No.: WO2019/002666
PCT Pub. Date: Jan. 3, 2019

(65) Prior Publication Data
US 2020/0154231 A1 May 14, 2020

(30) Foreign Application Priority Data
Jun. 26, 2017 (EP) .................... 17177803

(51) Int. Cl.
*H04S 7/00* (2006.01)
*G06F 3/16* (2006.01)
*H04N 9/802* (2006.01)

(52) U.S. Cl.
CPC .............. *H04S 7/304* (2013.01); *G06F 3/165* (2013.01); *G06F 3/167* (2013.01);
(Continued)

(58) Field of Classification Search
None
See application file for complete search history.

(56) References Cited

U.S. PATENT DOCUMENTS 6,845,338 B1 * 1/2005 Willins .................. G01C 21/20
702/150
6,961,439 B2 11/2005 Ballas
(Continued)

FOREIGN PATENT DOCUMENTS

EP 2891955 A1 7/2015
GB 2545275 A 6/2017

OTHER PUBLICATIONS

Office action received for corresponding European Patent Application No. 17177803.8, dated Dec. 20, 2019, 17 pages.
(Continued)

*Primary Examiner* — Qin Zhu
(74) *Attorney, Agent, or Firm* — Harrington & Smith

(57) ABSTRACT

An apparatus, based on a first audio track of at least one audio track, the first audio track audibly presented to the user as spatial audio such that it is perceived to originate from a particular location and based on the user being within a predetermined distance of the particular location; configured to provide for a change in the audible presentation of the first audio track to the user from presentation as spatial audio to presentation as at least one of monophonic and stereophonic audio.

21 Claims, 8 Drawing Sheets

(52) U.S. Cl.
CPC ....... *H04S 2400/01* (2013.01); *H04S 2400/11* (2013.01); *H04S 2420/01* (2013.01)

(56) References Cited

U.S. PATENT DOCUMENTS

| | | | | |
|---|---|---|---|---|
| 8,559,646 | B2 * | 10/2013 | Gardner | H04L 65/403 379/202.01 |
| 8,682,679 | B2 | 3/2014 | Breebaart | |
| 9,942,687 | B1 * | 4/2018 | Chemistruck | H04S 7/304 |
| 2007/0172086 | A1 | 7/2007 | Dickins et al. | |
| 2009/0262946 | A1 * | 10/2009 | Dunko | H04S 1/002 381/17 |
| 2009/0282335 | A1 | 11/2009 | Alexandersson | |
| 2013/0170679 | A1 * | 7/2013 | Nystrom | H04R 5/033 381/311 |
| 2013/0216045 | A1 * | 8/2013 | Jaisimha | G06F 3/16 381/17 |
| 2014/0347390 | A1 | 11/2014 | Poulos et al. | |
| 2015/0193197 | A1 * | 7/2015 | Nahman | G06F 3/017 715/716 |
| 2016/0026253 | A1 | 1/2016 | Bradski et al. | |
| 2017/0188168 | A1 * | 6/2017 | Lyren | G10L 19/22 |
| 2018/0220253 | A1 * | 8/2018 | Karkkainen | H04S 7/304 |

OTHER PUBLICATIONS

Extended European Search Report received for corresponding European Patent Application No. 17177803.8, dated Nov. 13, 2017, 10 pages.
International Search Report and Written Opinion received for corresponding Patent Cooperation Treaty Application No. PCT/FI2018/050431, dated Aug. 29, 2018, 16 pages.

\* cited by examiner

Figure 1
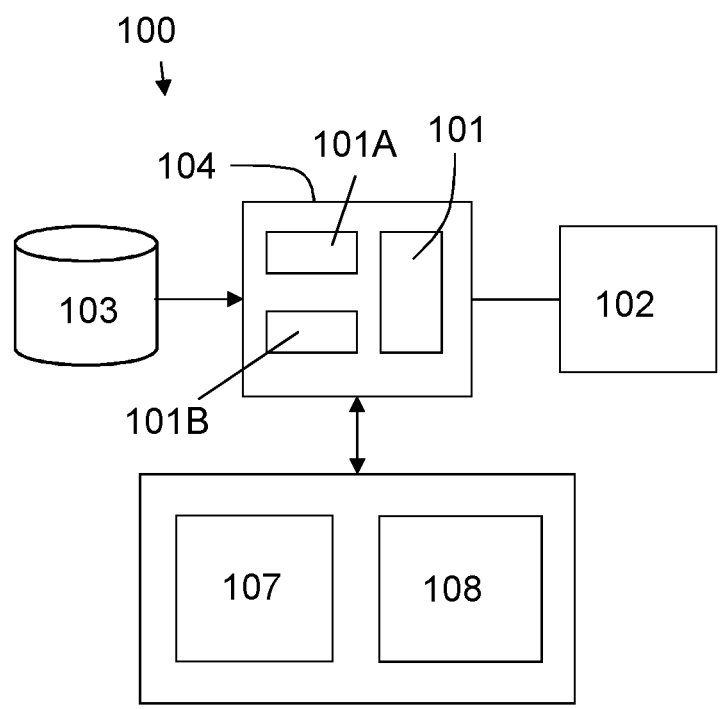
Figure 2
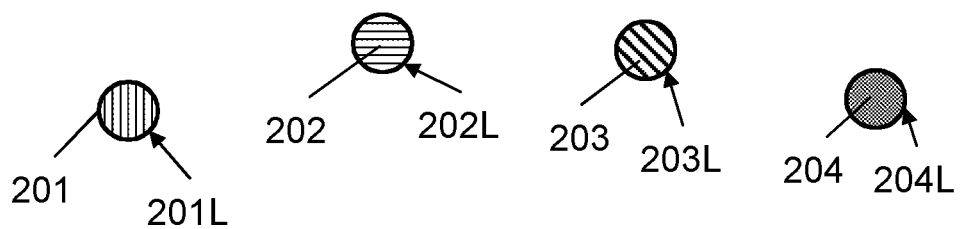
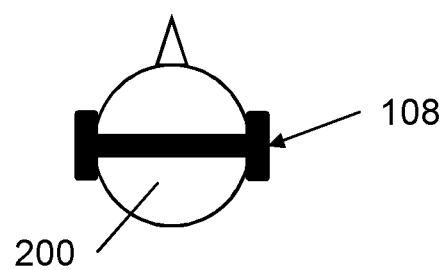

Figure 13

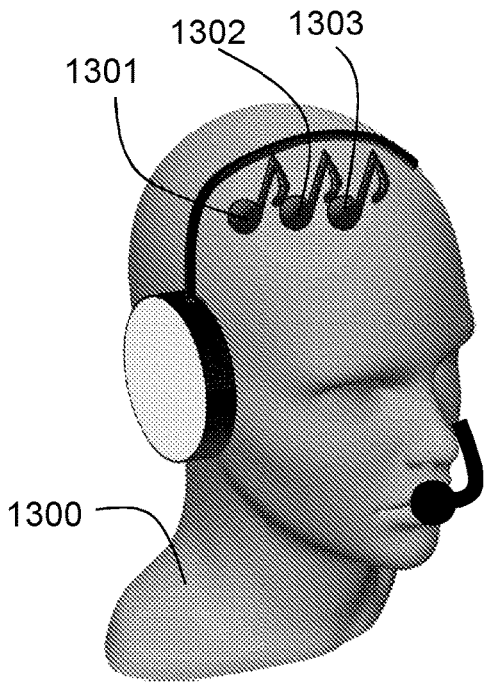

Figure 14

1401 — based on a first audio track of at least one audio track, the first audio track audibly presented to the user as spatial audio such that it is perceived to originate from a particular location and based on the user being within a predetermined distance of the particular location;

1402 — providing for a change in the audible presentation of the first audio track to the user from presentation as spatial audio to presentation as at least one of monophonic and stereophonic audio.

APPARATUS AND ASSOCIATED METHODS FOR AUDIO PRESENTED AS SPATIAL AUDIO

RELATED APPLICATION

This application was originally filed as PCT Application No. PCT/FI2018/050431, filed on Jun. 11, 2018, which claims priority from EP Application No. 17177803.8, filed on Jun. 26, 2017.

TECHNICAL FIELD

The present disclosure relates to the field of spatial audio and, in particular, to the field of changing the way in which audio tracks are audibly presented to a user, associated methods, computer programs and apparatus.

BACKGROUND

The augmentation of real-world environments with graphics and audio is becoming common, with augmented/virtual reality content creators providing more and more content for augmentation of the real-world as well as for virtual environments. The presentation of audio as spatial audio, which is such that the audio is perceived to originate from a particular location, is useful for creating realistic augmented reality environments and virtual reality environments. The effective and efficient management of spatial audio for a user may be challenging.

The listing or discussion of a prior-published document or any background in this specification should not necessarily be taken as an acknowledgement that the document or background is part of the state of the art or is common general knowledge. One or more aspects/examples of the present disclosure may or may not address one or more of the background issues.

SUMMARY

In a first example aspect there is provided an apparatus comprising:
  at least one processor; and
  at least one memory including computer program code,
  the at least one memory and the computer program code configured to, with the at least one processor, cause the apparatus to perform at least the following:
  based on a first audio track of at least one audio track, the first audio track audibly presented to the user as spatial audio such that it is perceived to originate from a particular location and based on the user being within a predetermined distance of the particular location;
  provide for a change in the audible presentation of the first audio track to the user from presentation as spatial audio to presentation as at least one of monophonic and stereophonic audio.

In one or more examples, when the first audio track is presented as spatial audio, signalling indicative of movement of the user provides for modification of one or more of the direction from which the audio track is perceived to originate relative to the user's head and its volume; and
  when the first audio track is presented as at least one of monophonic and stereophonic audio, signalling indicative of movement of the user does not provide for modification of one or more of the direction from which the audio track is perceived to originate relative to the user's head and its volume. Accordingly, in one or more examples, the first audio track may be perceived by the user to change from being heard from the particular location to being taken with the user as they move away from the particular location. Thus, in one or more examples, the user may perceive that they have "picked up" the first audio track after they move away from the particular location such that they can continue to listen to the audio of the first audio track without the spatial audio effect as they continue moving about in a virtual or real-world space.

In one or more embodiments, the first audio track is audibly presented as spatial audio by processing the audio track using one or more of:
  i) a head-related-transfer-function filtering technique;
  ii) a vector-base-amplitude panning technique; and
  iii) binaural audio presentation.

In one or more embodiments, the provision of the change to monophonic or stereophonic audio is based on the user being within a predetermined distance of the particular location and providing a predefined user input.

In one or more examples, the user input comprises at least one or more of:
  a) a head movement gesture to position an ear of the user adjacent to or at the particular location;
  b) a user hand gesture towards the particular location;
  c) a voice command;
  d) a user input via a user input terminal.

In one or more embodiments, the particular location and the location of the user is defined relative to one of:
  a virtual space, the virtual space comprising a virtual environment in which a representation of the user is free to move; and
  a real-world space in which the user is located.

In one or more embodiments, the user is associated with at least two speakers, the two speakers located on opposed sides of the user's head to provide audio to different ears and wherein based on a side of the head of the user that is closest to the particular location, at least within a predetermined time window prior to provision of said change, defines, at least in part, which one of the at least two speakers the first audio track is provided to for audible presentation with a greater volume than the other when the apparatus provides for said presentation of the first audio track as one of monophonic and stereophonic audio.

In one or more embodiments, based on the user being presented with a second audio track as one of monophonic and stereophonic audio, the provision of the change in the audible presentation of the first audio track provides for:
  audible presentation of the first audio track with a first speaker distribution profile; and
  audible presentation of the second audio track with a second speaker distribution profile different to the first speaker distribution profile; wherein
  the first and second speaker distribution profiles define at least which of a first speaker and a second speaker the audio track is presented to, the first and second speakers located on opposed sides of the user's head to provide audio to the user's left and right ears.

In one or more examples, the speaker distribution profiles are configured such that the apparatus is caused to provide a left stereo channel and a right stereo channel and, optionally, a centre stereo channel for use in presentation of the first audio track, the second audio tracks and any further audio tracks.

In one or more embodiments,
  a) the second speaker distribution profile is the same speaker distribution profile used to present the second audio track prior to audible presentation of the first audio track as one of monophonic and stereophonic audio;

b) the second speaker distribution profile is a different speaker distribution profile used to present the second audio track prior to audible presentation of the first audio track as one of monophonic and stereophonic audio.

In one or more embodiments, a predetermined audio track limit of two or greater is provided that limits the number of audio tracks that can be presented to the user as one of monophonic and stereophonic audio at any one time; and wherein based on the user being presented with a maximum number of audio tracks as one of monophonic and stereophonic audio that meets said audio track limit; and based on the provision of the change in the audible presentation of the first audio track, the apparatus is caused to provide for the ceasing of the audible presentation as one of monophonic and stereophonic audio of at least one of the maximum number of audio tracks.

In one or more examples, the apparatus is caused to maintain a list of audio tracks presented to the user as one of monophonic and stereophonic audio at any one time. In one or more examples, a predetermined audio track limit of two or greater is provided that limits the number of audio tracks in said list. In one or more examples, the apparatus is caused to provide for audible presentation of audio tracks in the list and not provide for audible presentation of audio tracks not in the list, wherein the addition of an audio track to the list when the audio track limit has been reached provides for removal of an audio track from the list. The removal may be on a first in first out basis or may be user-selected.

In one or more embodiments, the apparatus is caused to maintain a list of audio tracks for presentation to the user as one of monophonic and stereophonic audio at any one time, and the audio tracks in said list are user selectable such that on selection of one of the audio tracks in the list, the apparatus is caused to provide for audible presentation of the selected audio track without unselected audio tracks in the list as one of monophonic and stereophonic audio.

In one or more examples, user selection may be provided by a user gesture, such as a head movement gesture or, more particularly, an up or down head movement gesture.

In one or more examples, based on the apparatus being caused to provide for ceasing of the audible presentation of at least one of the maximum number of audio tracks and based on the user providing a user input indicative of a desire to prevent the ceasing of the audible presentation, provide for incremental increasing of the audio track limit such that the first audio track is presented along with the said audio tracks in said list. In one or more examples, the user input comprises the user placing their hand adjacent or over one or both of their ears.

In one or more embodiments, based on signalling indicative of a detection of a predetermined head movement of the user, the apparatus is caused to provide for ceasing of audible presentation of at least one audio track presented to the user as one of monophonic and stereophonic audio.

In one or more examples, the predetermined head movement may comprise tilting of the user's head. The user may associate such a predetermined head movement with an imaginary action of tipping the audio track out of their head. In one or more examples, based on a plurality of audio tracks being presented to the user as one of monophonic and stereophonic audio, the apparatus is configured to select which of the plurality of audio tracks ceases presentation based on a direction to which the user tilts their head as indicated in the signalling. In one or more examples, one of the plurality of audio tracks may be presented primarily to the left speaker and a second of the plurality of audio tracks may be presented primarily to the right speaker and therefore the detection of tilting of the user's head to the left may provide for ceasing presentation of the audio track presented to the left speaker and, likewise, detection of tilting of the user's head to the right may provide for ceasing presentation of the audio track presented to the right speaker.

In one or more embodiments, the first audio track comprises one of a plurality of audio tracks, the plurality of audio tracks audibly presented to the user as spatial audio such that each is perceived to originate from a respective particular location, and based on a user input indicative of a selection of the plurality of audio tracks;

provide for a change in the audible presentation of the plurality of audio tracks to the user from presentation as spatial audio to presentation as at least one of monophonic and stereophonic audio.

In one or more examples, the user input may comprise a user gesture directed to the respective particular locations at which the plurality of audio tracks are perceived to originate.

In one or more examples, upon the change in the audible presentation of the plurality of audio tracks, a speaker distribution profile is defined for each audio track, the speaker distribution profile defining at least to what degree the audio track is presented to a first speaker and a second speaker the audio, the first speaker configured to present audio to a left ear of the user and the second speaker configured to present audio to a right ear of the user, the speaker distribution profile determined based on the relative locations of the particular locations of the plurality of audio tracks.

In one or more embodiments, based the user being within a predetermined user-transfer distance of a second user, provide for generation of signalling to provide for one or more of i) presentation of a shared audio track to the second user as at least one of monophonic and stereophonic audio, the shared audio track comprising an audio track presented to the first user as at least one of monophonic and stereophonic audio; and ii) presentation of a shared audio track to the first user as at least one of monophonic and stereophonic audio, the shared audio track comprising an audio track presented to the second user as at least one of monophonic and stereophonic audio.

In one or more embodiments, the provision of the signalling is further based on a user gesture from one or both of the user and the second user.

In a further aspect there is provided a method, the method comprising based on a first audio track of at least one audio track, the first audio track audibly presented to the user as spatial audio such that it is perceived to originate from a particular location and based on the user being within a predetermined distance of the particular location;

providing for a change in the audible presentation of the first audio track to the user from presentation as spatial audio to presentation as at least one of monophonic and stereophonic audio.

In a further aspect there is provided a computer readable medium comprising computer program code stored thereon, the computer readable medium and computer program code being configured to, when run on at least one processor, perform the method of:

based on a first audio track of at least one audio track, the first audio track audibly presented to the user as spatial audio such that it is perceived to originate from a particular location and based on the user being within a predetermined distance of the particular location;

providing for a change in the audible presentation of the first audio track to the user from presentation as spatial audio to presentation as at least one of monophonic and stereophonic audio.

In a further aspect there is provided an apparatus, the apparatus comprising means configured to;

based on a first audio track of at least one audio track, the first audio track audibly presented to the user as spatial audio such that it is perceived to originate from a particular location and based on the user being within a predetermined distance of the particular location;

provide for a change in the audible presentation of the first audio track to the user from presentation as spatial audio to presentation as at least one of monophonic and stereophonic audio.

The present disclosure includes one or more corresponding aspects, examples or features in isolation or in various combinations whether or not specifically stated (including claimed) in that combination or in isolation. Corresponding means and corresponding functional units (e.g., function enabler, AR/VR graphic renderer, display device) for performing one or more of the discussed functions are also within the present disclosure.

Corresponding computer programs for implementing one or more of the methods disclosed are also within the present disclosure and encompassed by one or more of the described examples.

The above summary is intended to be merely exemplary and non-limiting.

BRIEF DESCRIPTION OF THE FIGURES

A description is now given, by way of example only, with reference to the accompanying drawings, in which:

FIG. 1 illustrates an example apparatus for providing for a change in the audible presentation of an audio track;

FIG. 2 shows an example of a user being presented with spatial audio from four virtual locations each having an audio track associated therewith;

FIG. 13 shows an example augmented reality view of a user with augmented reality graphics to illustrate the number/presentation of the audio tracks as stereophonic/monophonic audio;

FIG. 14 shows a flowchart illustrating an example method; and

DESCRIPTION OF EXAMPLE ASPECTS

Figure 3:
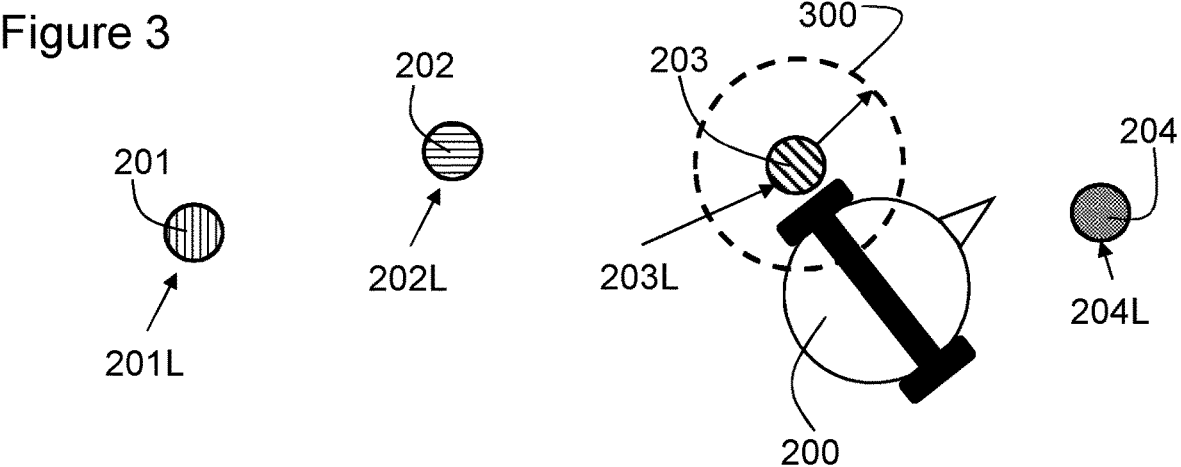
FIG. 3 shows an example of the user moving to a position within a predetermined distance of the particular location of a third audio track of the plurality of audio tracks and performing a gesture to lean their left ear towards it.

Virtual reality (VR) may use a VR display comprising a headset, such as glasses or goggles or virtual retinal display, or one or more display screens that surround a user to provide the user with an immersive virtual experience. A virtual reality apparatus, which may or may not include the VR display, may provide for presentation of multimedia VR content representative of a virtual reality scene to a user to simulate the user being present within the virtual reality scene. Accordingly, in one or more examples, the VR apparatus may provide signalling to a VR display for display of the VR content to a user while in one or more other examples, the VR apparatus may be part of the VR display, e.g. part of the headset. The virtual reality scene may therefore comprise the VR content displayed within a three-dimensional virtual reality space so that the user feels immersed in the scene, as if they were there, and may look around the VR space at the VR content displayed around them. The virtual reality scene may replicate a real world scene to simulate the user being physically present at a real world location or the virtual reality scene may be computer generated or a combination of computer generated and real world multimedia content. Thus, the VR content may be considered to comprise the imagery (e.g. static or video imagery), audio and/or accompanying data from which a virtual reality scene may be generated for display. The VR apparatus may therefore provide the VR scene by generating the virtual, three-dimensional, VR space in which to display the VR content. The virtual reality scene may be provided by a panoramic video (such as a panoramic live broadcast), comprising a video having a wide or 360° field of view (or more, such as above and/or below a horizontally oriented field of view). A panoramic video may have a wide field of view in that it has a spatial extent greater than a field of view of a user or greater than a field of view with which the panoramic video is intended to be displayed.

The VR content provided to the user may comprise live or recorded images of the real world, captured by a VR content capture device, for example. An example VR content capture device comprises a Nokia Technologies OZO device. As the VR scene is typically larger than a portion a user can view with the VR display, the VR apparatus may provide, for display on the VR display, a virtual reality view of the VR scene to a user, the VR view showing only a spatial portion of the VR content that is viewable at any one time. The VR apparatus may provide for panning around of the VR view in the VR scene based on movement of a user's head and/or eyes. A VR content capture device may be configured to capture VR content for display to one or more users. A VR content capture device may comprise one or more cameras and, optionally, one or more (e.g. directional) microphones configured to capture the surrounding visual and aural scene from a capture point of view. In some examples, the VR content capture device comprises multiple, physically separate cameras and/or microphones. Thus, a musical performance may be captured (and recorded) using a VR content capture device, which may be placed on stage, with the performers moving around it or from the point of view of an audience member. In each case a consumer of the VR content may be able to look around using the VR display of the VR apparatus to experience the performance at the capture location as if they were present.

Augmented reality (AR) may use an AR display, such as glasses or goggles or a virtual retinal display, to augment a view of the real world (such as seen through the glasses or goggles) with computer generated content. An augmented reality apparatus, which may or may not include an AR display, may provide for presentation of multimedia AR content configured to be overlaid over the user's view of the real-world. Thus, a user of augmented reality may be able to view the real world environment around them, which is augmented or supplemented with content provided by the augmented reality apparatus, which may be overlaid on their view of the real world and/or aurally overlaid over an aural real world scene they can hear. The content may comprise multimedia content such as pictures, photographs, video, diagrams, textual information, aural content among others. Thus, while augmented reality may provide for direct viewing of the real world with the addition of computer generated graphics and/or audio content, a user of virtual reality may only be able to see content presented on the VR display of the virtual reality apparatus substantially without direct viewing of the real world.

In addition to the audio received from the microphone(s) of the VR content capture device further microphones each associated with a distinct audio source may be provided. In one or more examples, the VR content capture device may not have microphones and the aural scene may be captured by microphones remote from the VR content capture device. Thus, microphones may be provided at one or more locations within the real world scene captured by the VR content capture device, each configured to capture audio from a distinct audio source. For example, using the musical performance example, a musical performer or a presenter may have a personal microphone. Knowledge of the location of each distinct audio source may be obtained by using transmitters/receivers or identification tags to track the position of the audio sources, such as relative to the VR content capture device, in the scene captured by the VR content capture device. Thus, the VR content may comprise the visual imagery captured by one or more VR content capture devices and the audio captured by the one or more VR content capture devices and, optionally/alternatively, one or more further microphones. The location of the further microphones may be provided for providing spatial audio.

Spatial audio comprises audio presented in such a way to a user that it is perceived to originate from a particular location, as if the source of the audio was located at that particular location. Thus, virtual reality content may be provided with spatial audio having directional properties, such that the audio is perceived to originate from a point in the VR space, which may be linked to the imagery of the VR content. Augmented reality may be provided with spatial audio, such that the spatial audio is perceived as originating from real world objects visible to the user and/or from augmented reality graphics overlaid over the user's view.

Spatial audio may be presented independently of visual virtual reality or visual augmented reality content. Nevertheless, spatial audio, in some examples, may be considered to be augmented reality content because it augments the aural scene perceived by a user. As an example of independent presentation of spatial audio, a user may wear headphones and, as they explore the real world, they may be presented with spatial audio such that the audio appears to originate at particular locations associated with real world objects or locations. For example, a city tour could be provided by a device that tracks the location of the user in the city and presents audio describing points of interest as spatial audio such that the audio appears to originate from the point of interest around the user's location.

The spatial positioning of the spatial audio may be provided by 3D audio effects, such as those that utilise a head related transfer function to create a spatial audio space in which audio can be positioned for presentation to a user. Spatial audio may be presented by headphones by using head-related-transfer-function (HRTF) filtering techniques or, for loudspeakers, by using vector-base-amplitude panning techniques to position the perceived aural origin of the audio content. Spatial audio may use one or more of volume differences, timing differences and pitch differences between audible presentation to each of a user's ears to create the perception that the origin of the audio is at a particular location in space.

In some examples, an audio track, which comprises audio content for presentation to a user, may be provided for presentation as spatial audio. Accordingly, the audio track may be associated with a particular location which defines where the user should perceive the audio of the audio track as originating. The particular location may be defined relative to a virtual space or a real-world space. The virtual space may comprise a three-dimensional environment that at least partially surrounds the user and may be explorable by the user. The virtual space may be explorable in terms of the user being able to move about the virtual space by at least translational movement based on user input. If the spatial audio is provided with virtual reality content, virtual reality imagery may be displayed in the virtual space along with spatial audio to create a virtual reality experience. If the spatial audio is provided with visual augmented reality content or independently of augmented or virtual reality content, the particular location may be defined relative to a location in the real world, such as in a real-world room or city.

As mentioned above, the audio track may be associated with location information indicative of the particular location at which the audio of the audio track should be perceived as originating. In some examples, the location information may identify an object, which may or may not be moveable, and which may be designated as the location from which the spatial audio should be perceived as originating. Thus, a real world object may be designated and when that real world object is identified in a space in which the user is located, the user may be presented with spatial audio such that they perceive the audio of the audio track to originate from said real world object. In some examples, the audio track is not associated with location information and instead it is decided at the time of presentation where to place the particular location defining the origin of the spatial audio.

FIG. 1 shows an example system 100 for presentation of spatial audio to a user. The system 100 includes an example apparatus 101 for controlling the presentation of audio tracks based on the user's location. The apparatus 101 may comprise or be connected to a processor 101A and a memory 101B and may be configured to execute computer program code. The apparatus 101 may have only one processor 101A and one memory 101B but it will be appreciated that other embodiments may utilise more than one processor and/or more than one memory (e.g. same or different processor/memory types). Further, the apparatus 101 may be an Application Specific Integrated Circuit (ASIC).

The processor may be a general purpose processor dedicated to executing/processing information received from other components, such as from a location tracker 102 and a content store 103, in accordance with instructions stored in the form of computer program code in the memory. The output signalling generated by such operations of the processor is provided onwards to further components, such as to audio presentation equipment, such as headphones 108.

The memory 101B (not necessarily a single memory unit) is a computer readable medium (solid state memory in this example, but may be other types of memory such as a hard drive, ROM, RAM, Flash or the like) that stores computer program code. This computer program code stores instructions that are executable by the processor, when the program code is run on the processor. The internal connections between the memory and the processor can be understood to, in one or more example embodiments, provide an active coupling between the processor and the memory to allow the processor to access the computer program code stored on the memory.

In this example the respective processors and memories are electrically connected to one another internally to allow for electrical communication between the respective components. In this example the components are all located proximate to one another so as to be formed together as an ASIC, in other words, so as to be integrated together as a single chip/circuit that can be installed into an electronic device. In some examples one or more or all of the components may be located separately from one another.

The apparatus 101, in this example, forms part of an augmented reality apparatus 104 for presenting visual imagery in augmented reality. In one or more other examples, the apparatus 101 may form part of a VR apparatus. In one or more examples, the apparatus 100 may be independent of an AR or VR apparatus and may provide signalling to audio presentation equipment 108 (such as speakers, which may be incorporated in headphones) for presenting the audio to the user. In this example, the processor 101A and memory 101B is shared by the AR apparatus 104 and the apparatus 101, but in other examples, they may have their own processors and/or memory.

The AR apparatus 104 may provide for display of one or more augmented reality graphics over the user's view using an AR headset 107. In one or more examples in which the apparatus 100 is independent of an AR or VR apparatus the AR headset may not be required and instead only the audio presentation equipment 108 may be provided.

The apparatus 101 or the AR apparatus 104 under the control of the apparatus 101 may provide for aural presentation of audio to the user using the headphones 108. The apparatus 101 may be configured to process the audio such that, at any one time, it is presented as one of spatial, monophonic and stereophonic audio or, alternatively or in addition, the apparatus 101 may provide signalling to control the processing and/or presentation of the audio. Accordingly, an audio processor (not shown) may perform the audio processing in order to present the audio in the ways mentioned above.

The apparatus 101 may receive signalling indicative of the location of the user from a location tracker 102. The location tracker 102 may determine the user's location in the real world so that it may be compared to the particular location(s) from which spatial audio is perceived to originate. If the spatial audio is provided in a virtual reality environment, the location tracker may provide signalling indicative of the user's virtual location in the virtual space in which the virtual reality experience is provided so that it may be compared to the virtual particular location(s) from which spatial audio is perceived to originate.

In the examples that follow, the one or more audio tracks, which may be provided from content store 103, may be processed such that they are presented to the user as spatial audio or stereophonic or monophonic audio. Accordingly, in a first instance, the audio track may be presented as spatial audio and as such may undergo audio processing such that it is perceived to originate from a particular location. In a second instance, the same audio track may be presented as monophonic audio and as such may undergo audio processing (if required) such that the audio is presented monophonically to one or both of a left and right speaker associated with the left and right ears of the user. In a third instance, the same audio track may be presented as stereophonic audio (if required) and as such may undergo audio processing such that the audio of the audio track is presented to one or both of a left and right speaker associated with the left and right ear of the user respectively. Monophonic audio, when presented to two speakers provides the same audio to both ears. Stereophonic audio may define two (left and right) or three (left, right, centre) stereo audio channels and the audio of the audio track may be presented to one or more of those channels. In some examples, the difference between stereophonic presentation and spatial audio presentation may be, for spatial audio, the use of a time delay between corresponding audio being presented to speakers associated with a respective left and right ear of the user and, for stereophonic presentation, the non-use of said time delay. It will be appreciated that the presentation of spatial audio may additionally use other presentation effects in addition to differences in the time that corresponding portions of the audio is presented to the user's ears to create the perception of a direction or location from which the audio is heard, such as volume differences amongst others.

While the same audio track may undergo audio processing in order to provide for its presentation as spatial audio or stereophonic or monophonic audio, as described above, in one or more other examples, the audio tracks may be pre-processed and may thus include different versions for presentation as spatial audio or stereophonic or monophonic audio.

FIG. 2 shows a plan view of a real-world environment with a user 200 wearing the headphones 108. In this example, the user is presented with four audio tracks as spatial audio. In the figures that follow an icon is used to represent each audio track, which are positioned at the locations from which the user 200 perceives them to originate. A first audio track 201 is presented as spatial audio such that it is perceived to originate at a first particular location marked as 201L. A second audio track 202 is presented as spatial audio such that it is perceived to originate at a second particular location marked as 202L. A third audio track 203 is presented as spatial audio such that it is perceived to originate at a third particular location marked as 203L. A fourth audio track 204 is presented as spatial audio such that it is perceived to originate at a fourth particular location marked as 204L. The pattern used in the figure may be used to distinguish the audio tracks 201-204 that is presented at the particular locations 201L, 202L, 203L, 204L. As the audio tracks are presented as spatial audio, the user 200 will perceive the first audio track to be heard from a direction front and left of their head; the second audio track will be heard from a direction front and slightly off centre to the left; the third audio track will be heard from a direction front and slightly off centre to the right; and the fourth audio track to be heard from a direction front and right of their head.

As an example, the audio tracks may comprise an audio description of different points of interest in the real-world environment and the user may be hearing a description of at least one of them. As another example, the audio tracks may comprise audio of a different instrument of an orchestra. Thus, the user may be touring a concert venue that may be physically absent of an orchestra but may hear a virtual orchestra and therefore the first to fourth particular locations may correspond to the locations of the virtual orchestra members, simulating a real world experience of the orchestra.

The user is free to explore the real world environment (obviously subject to physical barriers or rights of way) and may therefore approach the first through fourth particular locations 201L-204L. In other embodiments, where the user explores a virtual reality space rather than a real world space, the user may have a free view point in the virtual reality space, which may be known as six degrees of freedom VR or volumetric VR to those skilled in the art. Thus, the particular location of the presentation of the spatial audio may be defined relative to the real world or a virtual space depending on whether the user is experiencing the spatial audio independently of an AR or VR experience or as part of a VR experience. Accordingly, the user being within a predetermined distance of the particular location may be interpreted as being within a predetermined real-world distance or within a predetermined virtual distance in the virtual space. The principles of the example embodiments provided herein thus apply to (i) a user physically moving around a real world environment which is augmented with spatial audio; and (ii) a user provided with a view of a virtual reality space, in virtual reality, with the spatial audio provided at particular locations in the virtual reality space, the user providing user input to move about in the virtual reality space and accordingly provided with a corresponding view of the virtual reality space based on the user input.

As will be appreciated when the audio is presented as spatial audio, when the user changes their location in the real world environment, there is a corresponding change in the presentation of audio track as spatial audio. For example, the volume of the audio track presented to the user may be a function of the distance of the user from the corresponding particular location. Thus, in one or more examples, as the user moves towards the particular location the spatial audio presented audio track is presented louder and as the user moves away the audio track is presented more quietly. Also, as the user moves their head, the direction (relative to the user's head) from which the spatial audio is perceived to originate changes in accordance with the direction to the particular location relative to the user's direction of view.

The user may wish to listen to one or more of the audio tracks while they continue to explore the real-world environment rather that remaining near the particular location. In one or more examples, the apparatus 101 may provide a way for the user to collect or pick up audio track(s) that are presented as spatial audio in the space in which the user is located. In one or more examples, the audio processing required to present an audio track as spatial audio may affect its quality or fidelity compared to stereophonic or monophonic presentation. Accordingly, stereophonic or monophonic presentation of the audio track may provide for an improved experience when listening to said audio in some situations. The apparatus 101 may provide a way for the user to listen to audio tracks presented as spatial audio with improved quality or fidelity.

The example of FIG. 3 shows the user having approached the third particular location 203L and arrived at a position within a predetermined distance 300 of the third particular location 203L. The particular locations 201L-204L, in one or more embodiments, may be marked by an augmented reality graphic, which the user may see through the AR headset 107. In other embodiments, no augmented reality graphic may be provided and the user may rely on their aural perception of the particular locations in order to navigate to a location within the predetermined distance of them. If the user were exploring a VR space, the particular locations likewise may or may not be marked with a visual graphic.

Figure 4:
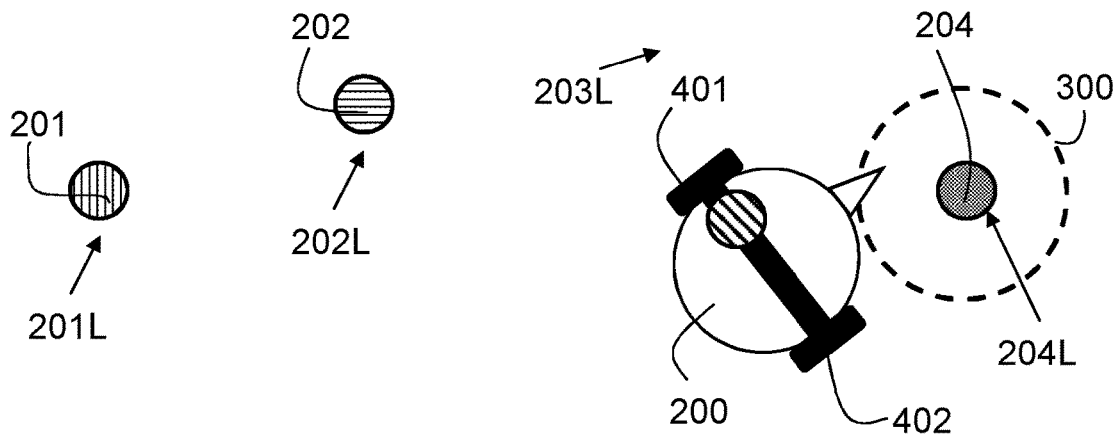
FIG. 4 shows an example of the audio track having changed from presentation as spatial audio to presentation as stereophonic audio.

In this example the apparatus 101, based on the third audio track 203 being audibly presented to the user as spatial audio (as shown in FIG. 2) such that it is perceived to originate from a particular location 203L and based on the user being within the predetermined distance 300 of the particular location 203L; provides for a change in the audible presentation of the third audio track 203 to the user 200 from presentation as spatial audio to presentation as at least one of monophonic and stereophonic audio (as shown in FIG. 4, described below).

Thus, in the example of FIG. 3, the apparatus 101 may determine that the user 200 is desirous of "picking up" the third audio track 203 by virtue of the signalling from the location tracker 102 indicating that the user is within the predetermined distance 300 of the third particular location. The third particular location 203L may be known by or reported to the apparatus 101 by the AR apparatus 104 or whatever other apparatus is responsible for presenting spatial audio. The predetermined distance may be less than 0.5, 1, 2, 3, 4 or 5 metres. The apparatus 101 may define the predetermined distance based on how close or how many other particular locations for other spatial audio tracks are nearby. Thus, for a crowded area, the predetermined distance may be smaller than for an uncrowded area, so that it is clearer which audio track the user intends to interact with. The predetermined distance may be visually presented to the user 200, such as via AR display 107 by the apparatus 101, so that the user 200 can see how close they need to get to the particular location.

In the example of FIG. 4, the third audio track 203 is no longer presented as spatial audio and is instead presented as stereophonic audio to a left stereophonic channel associated with a left ear speaker 401 of left and right ear speakers 401 and 402. FIG. 4 shows the icon having the diagonal patterning which represents the third audio track 203 located in the user's head towards the left headphone speaker thereby indicating that it is presented stereophonically to (primarily) the left speaker.

It will be appreciated that in other embodiments, the audio of the third audio track 203 may be presented monophonically to both speakers 401 and 402. Alternatively, the third audio track may be presented to any one of the two or three stereophonic channels.

The user 200 may thereby be considered to have "picked up" the third audio track in that they may move away from the particular location and presentation of the third audio track may not be subject to the spatial audio modifications to presentation of its volume/perceived direction. Thus, the volume of the third audio track may not be a function of distance from the third particular location 203 when presented as stereophonic audio or monophonic audio while when presented as spatial audio it was. Further, when the user 200 looks around the space an audio track presented as spatial audio will be perceived to originate from the same direction in the space relative to the user 200 but when presented stereophonically/monophonically presentation of the audio track may be independent of the head orientation of the user 200. Thus, while presenting the third audio track 203 as spatial audio, signalling indicative of movement of the user would provide for modification of one or more of the direction from which the audio track is perceived to originate relative to the user's head and its volume. However, now that the third audio track is presented as stereophonic audio (as shown in FIG. 4), signalling indicative of movement of the user does not provide for modification of one or more of the direction from which the audio track is perceived to originate relative to the user's head and its volume.

In this embodiment, the ear or side of the head of the user 200 closest to the particular location when the user is within the predetermined distance 300 is used to determine, at least in part, to which ear the audio track is presented stereophonically. Thus, as shown in FIG. 3, the user 200 leant towards the third particular location with their left ear and, accordingly, the apparatus 101 is configured to change presentation of the third audio track 203 from spatial audio to stereophonic presentation to the left channel speaker or ear of the user 200. In one or more examples, the apparatus may be caused to provide for stereophonic audio presentation as follows:

a) determination that a user approached the particular location with the left side of their head may provide for presentation to the left stereo audio channel;

b) determination that a user approached the particular location with the right side of their head may provide for presentation to the right stereo audio channel; and optionally, c) determination that a user approached the particular location straight-on or without a substantial orientation to the left or right side of their head may provide for presentation to the centre stereo audio channel.

In one or more examples, the side of the head of the user 200 that is closest to the particular location within a predetermined time window around when the apparatus 101 provides for said change in audible presentation, defines, at least in part, which speaker 401, 402 the corresponding audio track is provided to for audible presentation. The time window may extend a period before and/or after the user moves within the predetermined distance 300. In one or more examples, a technical effect of the time window may be to overcome the user 200 being unable to exactly position their head at the time the user is within the predetermined distance 300. Thus, the apparatus 101 may be caused to determine, based on user head orientation data, which may be received from location tracker 102 or other apparatus, which side of the head the user 200 is closest to the third predetermined location 203L and provide for stereophonic presentation to the stereo channel corresponding to the determined side.

The predetermined time window may extend from a time when the user moves from outside to within the predetermined distance 300. In one or more examples, the apparatus 101 may determine, in a time window of 1, 2 or more seconds, which, if any, side of the user's head is directed towards the particular location 203L and then provide for said change in audible presentation. In one or more examples, the time window ends when the user moves from outside to within the predetermined distance 300 and thus, the apparatus 101 is caused to determine which, if any, side of the user's head is directed towards the particular location 203L as they approach and reach the predetermined distance 300. The apparatus may use the predetermined time window as a user input opportunity period in which the apparatus 101 identifies the occurrence of a user head gesture to present one side of the user's head to the particular location. In other examples, the apparatus may average the user's head orientation relative to the particular location over the predetermined time window to determine if the user 200 presented one side of the user's head to the particular location.

In some examples, the audio track may be presented exclusively to the ear of the user closest to the particular location when the user was within the predetermined distance. However, more generally, the audio track may be presented to the closest speaker at a greater volume than the other of the left and right speakers.

It will be appreciated that in other examples, the apparatus 101 may not determine which ear is closest to the particular location and may instead, on provision of the change in audio presentation, provide for presentation of the audio track to one or more of the stereophonic audio channels (left, right or centre, for example) based on one or more factors, such as a predetermined order, a user-preference order, and the presence of other audio tracks presented stereophonically to the user.

In one or more examples, to provide the change in audible presentation the apparatus may provide for ending of presentation of the third audio track 203 with one or more of:

i) a head-related-transfer-function filtering technique; and ii) a vector-base-amplitude panning technique; and may provide for presentation of the third audio track to said headphones or speakers without these spatial audio processing techniques. This may provide an improvement in quality of the audio due to the lack of spatial audio processing.

While not shown in the example of FIG. 3, in one or more examples, the apparatus 101 may provide for the change to monophonic or stereophonic audio based on the user being within the predetermined distance 300 of the particular location and providing a predefined user input. Thus, just being within the predetermined distance of the particular location of the audio track may not cause the apparatus 101 to change the audible presentation of the associated audio track but on receipt of a user input indicative of a desire to "pick up" the audio track, the apparatus may provide for the change to stereophonic/monophonic presentation.

The user input may comprise a head movement gesture to position an ear of the user adjacent towards or at the particular location. Thus, a user input comprising a head gesture or leaning the head or ear towards the particular location may be defined as the user input. In other examples, the user input may comprise a user hand gesture towards the particular location. In another example, the apparatus 101 may be caused to make the change in audible presentation if it additionally determines that a predetermined voice command has been issued. In another example, the user input may be provided via a smartphone, remote control or other user input terminal. In these examples, the user may approach a particular location and indicate their desire for the apparatus 101 to change presentation of the third audio track to one of stereophonic or monophonic audio by providing the user input to said user input terminal.

The example of FIG. 4 also shows the user approaching the particular location 204L of the fourth audio track 204. However, the user 200 already has the third audio track 203 presented to them as stereophonic audio to the left stereo channel. In one or more examples, the apparatus 101, based on the user being already presented with the third audio track as stereophonic audio, and moving to a location within the predetermined distance 300 of the fourth particular location 204L may provide for additional stereophonic or mixed monophonic presentation of the fourth audio track 204 along with the third audio track 203. Thus, for stereophonic presentation, the fourth audio track 204 may be presented to one of the other channels e.g. right stereo channel or centre stereo channel. Presentation on the left channel may result in exclusive presentation to a left ear of the user. Likewise, presentation on the right channel may result in exclusive presentation to a right ear of the user. In one or more examples, presentation on the centre channel may provide for presentation to the left and right ears equally. Thus, the additional audible presentation of the fourth audio track by the apparatus 101 may comprise the presentation on one other stereophonic channel to that used for the third audio track 203.

Thus, for stereophonic presentation of two or more audio tracks, the apparatus may provide for assigning of the audio tracks to different stereo channels. For monophonic presentation of two or more audio tracks the apparatus 101 may provide for mixing of the audio tracks and simultaneous presentation to one or both ears of the user.

In more general terms, for stereophonic presentation of multiple audio tracks (third 203 and fourth 204 in this example),
- audible presentation of the third audio track 203 may be made with a first speaker distribution profile; and
- audible presentation of the fourth audio track 204 may be made with a second speaker distribution profile different to the first speaker distribution profile; wherein
- the first and second speaker distribution profiles define at least which of a first speaker 401 and a second speaker 402 the audio of the respective audio track is presented to greater than the other, the first speaker 401 configured to present audio to a left ear of the user and the second speaker 402 configured to present audio to a right ear of the user 200.

Thus, in one or more examples the speaker distribution profiles may be configured to define the left/right or left/right/centre stereo channels mentioned above. Accordingly, a first speaker distribution profile may define a left stereo channel by defining 100% presentation to the left stereo channel and 0% to the right stereo channel. A second speaker distribution profile may define a right stereo channel by defining 100% presentation to the right stereo channel and 0% to the left stereo channel. A third speaker distribution profile may define a centre stereo channel by defining presentation to the left and right stereo channels simultaneously, possibly with 50% volume to the left and 50% volume to the right. In other examples, the speaker distribution profiles may define the volume the audio track is presented to each speaker or channel ranging from zero to a maximum volume. Thus, four or more audio tracks may be presented by use of speaker distribution profiles comprising exclusively left speaker/exclusively right speaker and further speaker distribution profiles wherein the volume presented to one of the speakers is greater than the other by different amounts, for example.

In one or more examples, the apparatus 101 provides for audible presentation of the audio tracks stereophonically by assignment of each audio track to one of a plurality of predefined audio track slots, each slot defined by a different predetermined speaker distribution profile.

In the example of FIG. 4, the user 200 has moved from outside the predetermined distance 300 to within the predetermined distance 300 with their right ear nearer to the particular location 204L of the fourth audio track 204.

Figure 5:
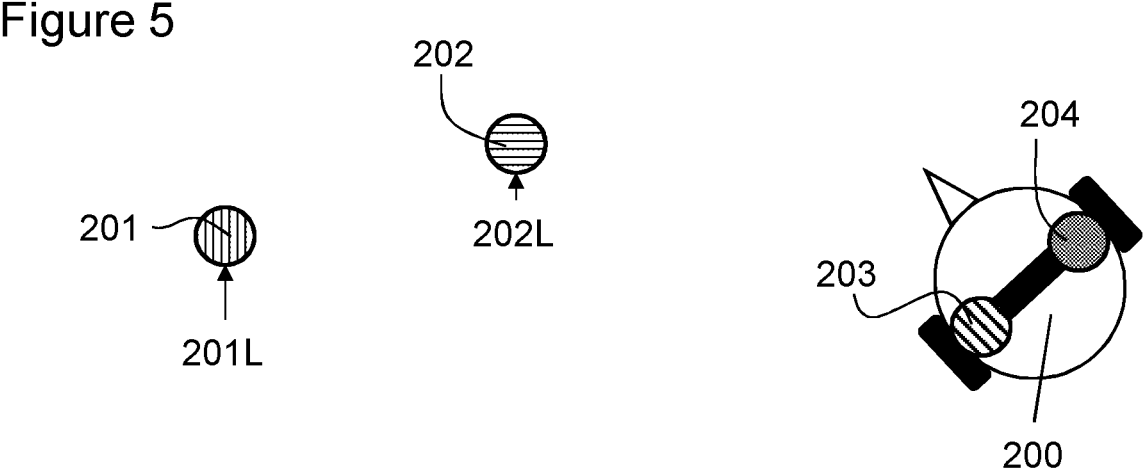
FIG. 5 shows the user having moved to a position within a predetermined distance of a particular location associated with a fourth of the audio tracks and having leaned their right ear towards the particular location of the fourth audio track.

Thus, with reference to the example shown in FIG. 5, the apparatus 101 has provided for stereophonic presentation of the fourth audio track to the right stereo channel and thus to the user's right ear. As shown in FIG. 5, the third audio track 203 shown with diagonal patterning is illustrated in the left side of the user's head and the fourth audio track 204 is shown with uniform shading is illustrated in the right side of the user's head to illustrate the sides to which the respective speaker distribution profiles are biased.

Figure 6:
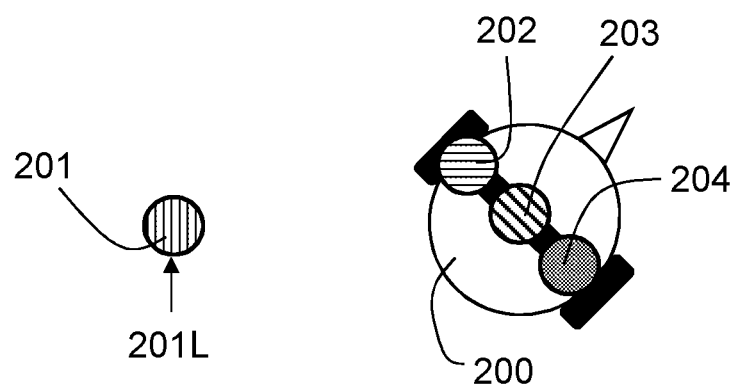
FIG. 6 shows the user having moved to a position within a predetermined distance of a second of the audio tracks and having leaned their left ear towards the particular location associated with the second audio track.

In the example of FIG. 6 the user has approached the second particular location 202L with their left ear towards the second particular location 202L. However, in this example, the third audio track is already presented to the left stereo channel/ear, as shown in FIG. 5.

In one or more examples, not shown in the figures, the apparatus 101 may provide for presentation of the second audio track to the centre stereo channel, which comprises a "spare" stereo channel on which no audio track is currently presented. However, this may not be what the user expected given they approached the second particular location with their left ear.

In FIG. 6, the apparatus 101, based on a user request, either by way of head orientation on approach to the second particular location of the second audio track or otherwise, has been caused to provide for stereophonic presentation to a slot or stereo channel that already has associated with it a different audio track, and has assigned one or more already-presented audio tracks to a different slot or stereo channel to make way for presentation of the second audio track to the desired slot or stereo channel indicated by the user request. Thus, the third audio track is no longer presented on the left stereo channel and is presented on the centre stereo channel, as illustrated by the diagonal patterned spot being positioned in the centre of the user's head. By reconfiguring which stereo channels or slots the "already stereophonically presented" audio tracks are assigned, the apparatus 101 provides an empty channel or slot for use in presentation of the "new" second audio track 202.

Thus, in this example, the second audio track is stereophonically presented to the left stereo channel, the third audio track has been moved to the centre channel and the fourth audio track is presented to the right stereo channel.

The apparatus 101 may be caused to provide an audio track limit configured limit the number of audio tracks that may be presented monophonically or stereophonically simultaneously. For example, for three channel stereophonic presentation the audio track limit may be three wherein each audio track is given a different stereo channel and no further audio tracks can then be presented simultaneously. Alternatively, if the audio tracks are presented monophonically the audio track limit may limit the number of audio tracks that are mixed together.

If the limit is reached, the apparatus 101 may not provide for changing of a further audio track from spatial audio presentation to one of stereophonic and monophonic presentation when the user is within the predetermined distance of its associated particular location. The apparatus may provide for presentation of a warning to the user to inform them that the audio track limit has been reached.

The user may need to provide a user input to select which of the audio tracks presented stereophonically/monophonically should cease being presented.

In this example, the audio track limit is three. Thus, in the example of FIG. 6, the apparatus 101 has provided for the presentation of the maximum number of audio tracks as one of monophonic and stereophonic audio up to said audio track limit.

Figure 7:
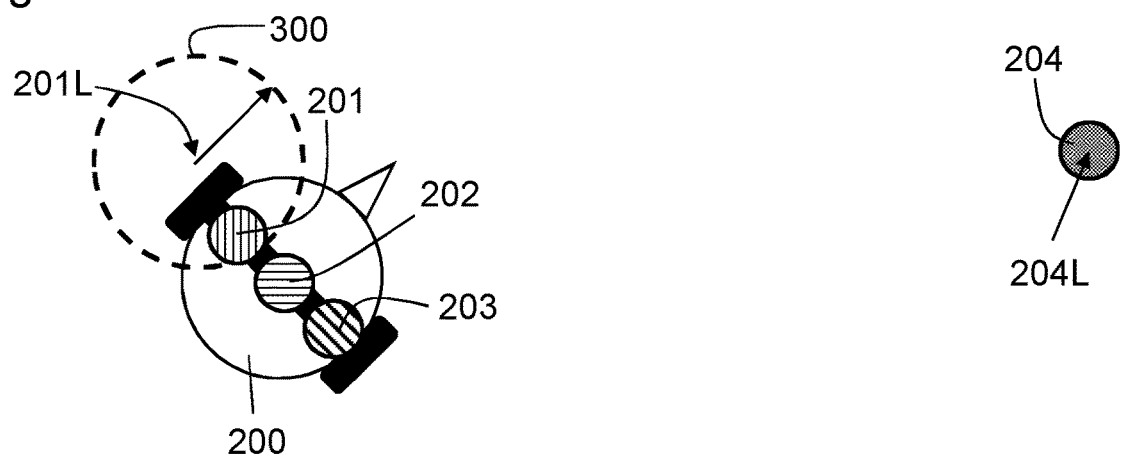
FIG. 7 shows the user having moved to a position within a predetermined distance of the particular location of a first of the audio tracks and having leaned their left ear towards the location which has "pushed out" the audio track associated with the fourth audio source.

FIG. 7 shows the user having moved to a location within the predetermined distance 300 of the first particular location 201L with their left ear closer to the particular location. Accordingly, the apparatus 101 provided for the change in the audible presentation of the first audio track from spatial audio to stereophonic audio. The first audio track has been assigned the left stereo channel in accordance with the user's left ear being identified as closest to the predetermined location. However, because the audio track limit is reached, the apparatus 101 has also provided for the ceasing of the stereophonic or monophonic audible presentation of at least one of the currently presented audio tracks, namely the fourth audio track in this example. The second and third audio tracks have been assigned to different stereo channels in order to vacate the left stereo channel for stereophonic presentation of the first audio track. Thus, based on stereophonic presentation of the first audio track to one of a left-most and right-most channel or slot, the apparatus may provide for ceasing of stereophonic presentation of the audio track provided on an opposite channel comprising the other of the left-most and right-most channel or slot. Additionally, the apparatus 101 may provide for shifting of the remaining audio channels to channels/slots that are more biased towards said other of the left-most and right-most channel or slot. This may be perceived by the user as adding the first audio track to their left ear has "pushed out" the audio track presented to their right ear, with the remaining audio tracks being shifted along towards the right ear.

In one or more examples, the apparatus may determine which channel or slot to present a currently-spatial-audio presented audio track when the audio track limit has been reached and the user is within the predetermined distance of the particular location of the currently-spatial-audio presented audio track based on user input. In one or more examples, the apparatus may determine which channel or slot to present a currently-spatial-audio presented audio track when the audio track limit has been reached based on user input. Thus, when the audio track limit has been reached, rather than use the ear closest to the particular location as an indicator of the channel or slot, the apparatus may be configured to select which slot or channel to present the currently-spatial-audio presented audio track based on user input. The apparatus, may further provide for ceasing stereophonic presentation of any audio track currently presented on the slot or channel selected by the user, to make way for the stereophonic presentation of the currently-spatial-audio presented audio track.

Further, in one or more examples, the user may select which stereophonically presented audio track to cease presentation of, so that a new audio track having a predetermined location within the predetermined distance of the user can be presented to any one slot or channel with the other stereophonically presented audio tracks being rearranged over the channels or slots as appropriate. In one or more examples, based on the user being within a predetermined distance of the particular location of where the audio of a further audio track is perceived to originate when the audio track limit is reached and based on user selection of one or more of the audio tracks already presented to the user as stereophonic audio, provide for ceasing of stereophonic presentation of the user-selected audio tracks and for stereophonic presentation of the further audio track. The further audio track may be presented on the same channel or slot as the user-selected audio track or a different one.

While the apparatus 101 may be caused to cease presentation of the fourth audio track as stereophonic audio, the fourth audio track may be presented once again as spatial audio from its fourth particular location 204L. It will be appreciated that the user 200 may have moved a sufficient distance away from the fourth particular location 204L and may therefore no longer be able to hear the fourth audio track (if it were presented at all). If the user is close enough to the fourth particular location 204L, the apparatus 101 may provide for presentation of the fourth audio track as spatial audio based on cessation of its presentation as stereophonic audio.

In one or more examples, the apparatus may provide for modification of the particular location 204L of the fourth audio track from the location where the user "picked up" the audio track and thus caused it to be presented stereophonically, to a new particular location (not shown in the figures) based on the location of the user when the apparatus was caused to cease presentation of the fourth audio track. Thus, in general, when a stereophonically presented audio track ceases stereophonic presentation, the apparatus may provide for audible presentation of the audio track as spatial audio with a particular location defined by the user's location at the time of ceasing stereophonic presentation. Accordingly, this may appear to the user as having "dropped" the audio at or near the user's current location and, subsequently, when they move away it is heard from the dropped location as spatial audio.

It will be appreciated that when the audio track limit is reached the rules followed by the apparatus 101 for selection of an audio track to cease presenting such that a new audio track can be presented monophonically or stereophonically may vary. For examples the apparatus may:

i) cease stereophonic/monophonic presentation of a first-in audio track comprising the audio track that was first presented monophonically or stereophonically out of the audio tracks currently presented in such a manner (this may be considered a first-in-first-out selection);

ii) provide for the requesting of user input to select an audio track for which to cease stereophonic/monophonic presentation;

iii) based on selection of the left or right side to present a "new" audio track, cease stereophonic/monophonic presentation of an opposite-side audio track comprising the audio track that is presented monophonically or stereophonically on a stereo channel or slot that is presented with most bias to an opposite speaker to the selected side.

In the above examples, the audio tracks presented monophonically or stereophonically are presented simultaneously to different channels or slots. However, in other embodiments, the audio tracks provided by the apparatus 101 for presentation monophonically or stereophonically may be maintained in a list of audio tracks for individual presentation to the user or for presentation of a subset of said audio tracks in the list. The audio tracks in said list may be user selectable such that on selection of one of the audio tracks in the list, the apparatus is caused to provide for audible presentation of the selected audio track without the other unselected audio tracks in the list as one of monophonic and stereophonic audio.

The user selection of audio tracks from the list may be provided by a user gesture, such as a head movement gesture, a hand gesture, a input via a user input terminal or in any other appropriate way. In one or more examples, a user input such as an up or down head movement gesture may provide for sequential selection of one of the audio tracks in the list.

In some examples, the audio track limit may be inconvenient to the user. For example, the user may not want one of the audio tracks presented monophonically or stereophonically to cease presentation upon presentation monophonically or stereophonically of a further audio track that would exceed the audio track limit. Accordingly, the apparatus 101 may, based on the audio track limit being exceeded and based on the user providing a user input indicative of a desire to prevent the ceasing of the audible presentation of one of the audio tracks, provide for incremental increasing of the audio track limit such that the further audio track is presented along with the said audio tracks already presented monophonically or stereophonically. In one or more examples, the user input comprises the user placing their hand adjacent or over one or both of their ears. Such a gesture may be intuitive as it may be considered to represent the user holding the audio in their head against the default action of the apparatus 101 to cease monophonically/stereophonically presentation of one of the audio tracks. The apparatus may receive user gesture information from a gesture tracker to determine the occurrence of user input. The increasing of the audio track limit may provide for definition, by the apparatus 101 of an additional slot in which to present the further audio track or in which to re-assign the other audio tracks.

Figure 8:
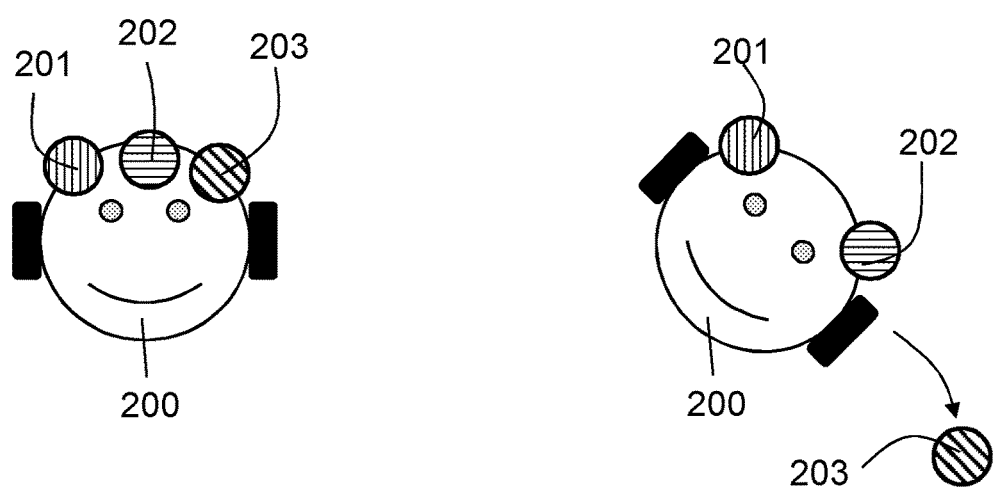
FIG. 8 shows a user before and after performing a user gesture to cease presentation of one of the stereophonically presented audio tracks.

FIG. 8 shows the apparatus 101 providing for user initiated ceasing of the presentation of one or more of the audio tracks that are presented monophonically/stereophonically. The left-hand side of FIG. 8 shows the user 200 with the first audio track presented to the right stereo channel, the second audio track presented to the centre stereo channel and the third audio track presented to the left stereo channel. The right-hand side of FIG. 8 shows the user having performed a user gesture comprising a tilt of their head to the left. The apparatus 101, based on signalling indicative of a detection of a predetermined head movement of the user to the left, may provide for ceasing of audible presentation of at least one audio track presented to the user as one of monophonic and stereophonic audio on the corresponding left stereo audio channel. Thus, such a gesture may be considered as "tipping out" the (third) audio track from the user's head that is presented on the (left) side they perform the tilting gesture. It will be appreciated that other head gestures, other gestures in general or other user input may be used to provide for user initiated ceasing of the presentation of one or more of the audio tracks that are presented monophonically/stereophonically The stereo audio channels or slots to which the audio tracks are monophonically/stereophonically presented may depend on the number of audio tracks presented monophonically/stereophonically. Thus, for example, FIG. 8 shows, after the user input provides for "tipping out" and therefore cessation of presentation of the third audio track, one or more of the other, remaining monophonically/stereophonically presented audio tracks being redistributed amongst the stereo channels/slots. Thus, in this example, the first audio track remains presented to the right stereo channel and the second audio track is reassigned to the left stereo channel from the centre stereo channel.

Figure 9:
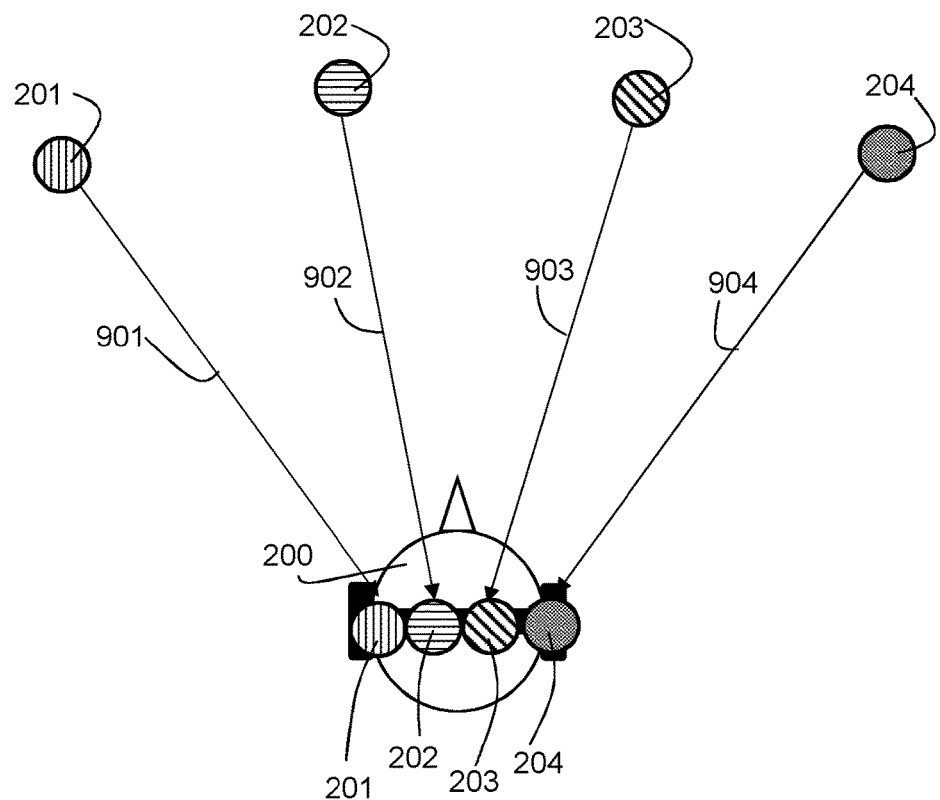
FIG. 9 shows a user having performed a user input to collectively change a plurality audio tracks associated with a plurality of different particular locations to presentation as stereophonic audio.

In the above examples, the "picking up" of single audio tracks is provided by the user being within the predetermined distance 300 of the particular location from which the spatially audio presented audio tracks is perceived to originate. FIG. 9 illustrates the apparatus 101 providing for the "picking up" of a plurality of audio tracks in one action rather than individually approaching the particular location of each of them.

With reference to the example shown in FIG. 9, the plurality of audio tracks are audibly presented to the user 200 as spatial audio such that each is perceived to originate from a respective particular location 201L, 202L, 203L, 204L. The apparatus 101, based on signalling indicative of a user input to select the first through fourth audio tracks 201-204 may be caused to provide for a change in the audible presentation of the plurality of audio tracks to the user 200 from presentation as spatial audio to presentation as at least one of monophonic and stereophonic audio. In particular, the user gesture may comprise a hand gesture, a head gesture or a selection input on a hand-held or other user input terminal (not shown). In one or more examples, the user input may comprise a user gesture directed to the respective particular locations at which the plurality of audio tracks are perceived to originate, such as wave of the hand.

The plurality of audio tracks 201-204 may then each be assigned to a different stereo audio channel or different slot. The stereo audio channel or slot assigned to each audio track may be based on the relative positions of the particular locations 201L, 202L, 203L, 204L in space. Thus, as shown in FIG. 9, the left-most particular location (the first particular location 201L) is assigned to the left stereo channel or slot with the left-most bias in its speaker distribution profile for presentation to the left and right speakers. Likewise, the right-most particular location (the fourth particular location 204L) is assigned to the right stereo channel or slot with the right-most bias in its speaker distribution profile for presentation to the left and right speakers. The second audio track and third audio track, being associated with the particular locations 202L, 203L between the left-most and right-most particular locations are assigned slots with speaker distribution profiles having a left/right speaker bias between the left-most bias and the right-most bias. The arrows 901-904 show the assignment of the first through fourth audio tracks each to one of four audio slots for stereophonic presentation.

In other examples, the apparatus 101 may provide for monophonic presentation of a mix of the first through fourth audio tracks based on the user input to select the first through fourth audio tracks.

Figure 10:
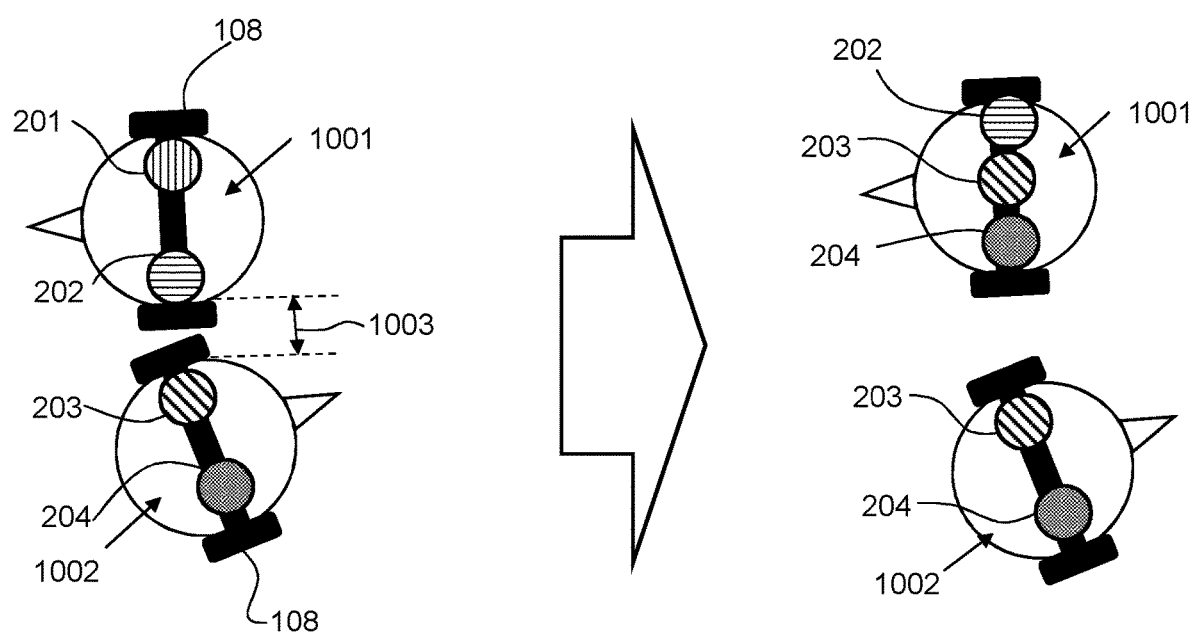
FIG. 10 shows a first example of the sharing of audio tracks between a first user and a second user.
Figure 11:
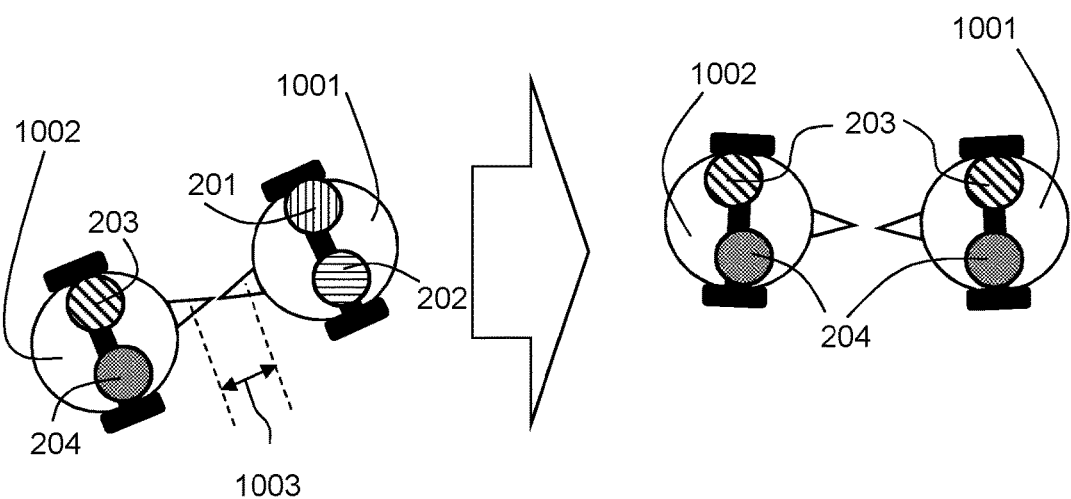
FIG. 11 shows a second example of the sharing of audio tracks between a first user and a second user.
Figure 12:
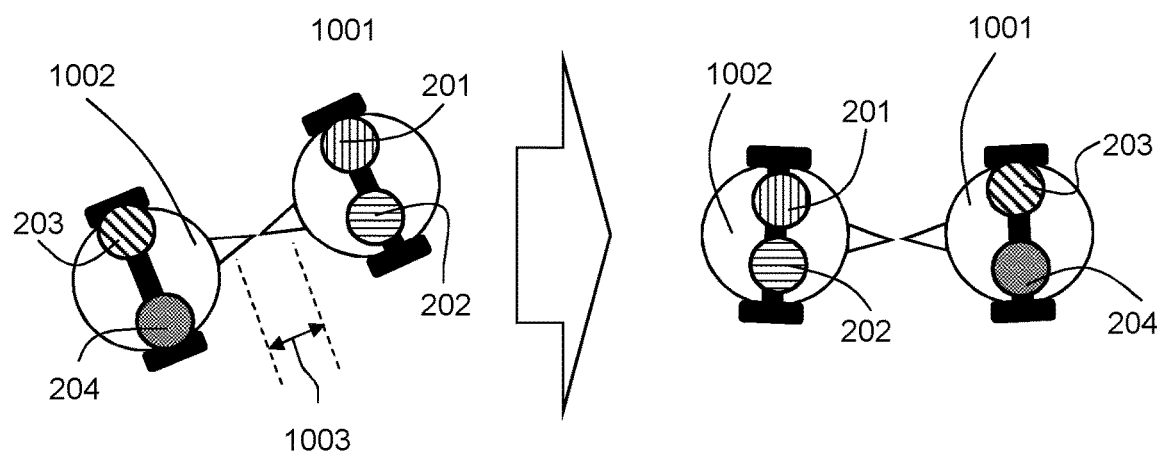
FIG. 12 shows a third example of the sharing of audio tracks between a first user and a second user that leads to the exchange stereophonically presented audio tracks.

The examples of FIGS. 10 to 12 illustrate the operation of the apparatus 101 to share audio tracks that are presented as one of monophonic and stereophonic audio to one user to another user.

The example of FIG. 10 shows a first user 1001 and a second user 1002 before and after sharing audio tracks. The first user 1001 and the second user 1002 may each be experiencing audio tracks presented as monophonic/stereophonic audio and, optionally, other audio tracks presented as spatial audio. Accordingly, each user 1001, 1002 may have a respective apparatus 101 and AR apparatus 104 to provide the experience exemplified above or a single apparatus 101 may provide for the experience for both users.

The first user 1001 is presented with the first audio track 201 stereophonically to the right stereo channel and the second audio track 202 stereophonically to the left stereo channel. The second user 1002 is presented with the third audio track 203 stereophonically to the left stereo channel and the fourth audio track 204 stereophonically to the right stereo channel.

The left-hand side of FIG. 10 shows the first user 1001 moving to a position relative to the second user 1002 such that the users are within a predetermined user-transfer distance 1003 of each other. The apparatus 101 may provide for generation of signalling to provide for presentation of one or more of the audio tracks presented monophonically or stereophonically to one of the first and second user to the other of the first and second user. In this example, the apparatus 101 provides for stereophonic presentation of the third audio track 203 and the fourth audio track 204 to the first user 1001, as shown on the right-hand side of FIG. 10. Thus, the audio tracks presented to the second user 1002 have been shared with the first user 1001.

The addition of the third and fourth audio tracks to the audio tracks presented stereophonically to the first user 1001 has caused the audio track limit (of 3) to be reached. Accordingly, the apparatus 101 has ceased presentation of the first audio track 201 and the second audio track 202 has been shifted to the right stereo channel to make way for the third and fourth audio tracks 203, 204 that are perceived as entering via the first user's left ear (given the orientation of the heads of the users when within the predetermined user-transfer distance 1003). The third and fourth audio tracks are presented on the centre and left stereo channels respectively.

The second user 1002 continues to be presented with the third and fourth audio tracks 203, 204.

It will be appreciated that other configurations of the audio tracks shared between users are possible. For example, the slots or channels used may be preserved between users. Thus, if the first user had the audio tracks presented on left and centre channels, the second user would also be presented with the audio tracks on the same left and centre channels. In one or more examples the audio tracks may be rearranged among the channels/slots or preserved in their channels/slots when receiving audio tracks from another user. In one or more examples, the listening experience may be reproduced and thus the slots or channels of a second user corresponding to the slots or channels used for stereophonic presentation of audio tracks to the first user may be used when audio tracks are shared from the first user to the second user. The apparatus may provide for ceasing presentation of or rearranging of any audio tracks among channels/slots that were already stereophonically presented before the first user shared their audio tracks with the second user.

In one or more examples, the apparatus 101 is caused to determine whether an audio track is shared from the first user 1001 to the second user 1002 or vice versa based on a user gesture from one or both users. For example, in this example, the first user 1001 moved towards the second user 1002, within the user-transfer distance 1003 or "bumped" their headphones 108 against the headphones 108 of the second user 1002. Accordingly, the user who made the move towards the other is selected as the user to receive an audio track from the other. In one or more examples, the audio track(s) may be received in the other direction.

The example of FIG. 11 shows a further example of sharing of the audio tracks presented monophonically/stereophonically. In this example, the first and second users 1001, 1002 approach each other, to within the user-transfer distance 1003, face to face. The users 1001, 1002 may bump foreheads or perform a gesture approaching physically bumping foreheads. Based on signalling indicating such a gesture has occurred and the users are within the predetermined user-transfer distance 1003, the apparatus 101 may provide for replacement of all of the monophonically/stereophonically presented audio tracks presented to one of the users with the monophonically/stereophonically presented audio tracks of the other user. Thus, compared to FIG. 10, in which the audio tracks were added to the other user's monophonically/stereophonically presented audio tracks up to the audio track limit, in this example, the audio tracks presented to one user replace those presented to the other user. With reference to FIG. 11, the first user 1001 is monophonically/stereophonically presented with the first and second audio tracks 201, 202. The second user 1002 is monophonically/stereophonically presented with the third and fourth audio tracks 203, 204. In this example, the first user 1001 made the face-to-face move towards the second user 1002. Accordingly, the first user 1001 is selected as the user to receive the audio tracks from the second user 1002. The right-hand side of FIG. 11 illustrates the audio tracks presented to each user after sharing.

The apparatus 101 has provided for the first and second audio tracks previously presented to the first user 1001 to cease presentation and be replaced with the audio tracks presented to the second user 1002. Thus, the first user 1001 is now presented with the third and fourth audio tracks 203, 204.

The stereo channels or slots to which the shared audio tracks are assigned may be based on the stereo channels or slots to which the audio tracks are assigned for the user from which the audio tracks are shared. Thus, the same listening experience may be achieved by the user "receiving" the shared audio tracks as the user sharing them. Alternatively, the apparatus 101 may assign the shared audio tracks to spare audio channels/slots depending on the physical arrangement between the users when performing a particular gesture indicative of the desire to share. Thus, "bumping" ears may provide for sharing of an audio track to a stereo channel associated with said ear.

In other examples, the one or more of the audio tracks presented to the users 1001, 1002 may be transferred between users rather than shared such that the audio track ceases to be presented to one user and begins to be presented to the other user.

In other examples one or more of the audio tracks presented monophonically/stereophonically to one user are exchanged with the audio tracks presented monophonically/stereophonically to the other user. FIG. 12 illustrates such an example. As in FIGS. 10 and 11, the left-hand side of FIG. 12 shows the monophonic/stereophonic presentation of audio tracks before sharing and the right-hand side illustrates post-sharing. Thus, the first user 1001 is presented with the first and second audio tracks 201, 202. The second user 1002 is presented with the third and fourth audio tracks 203, 204. Based on a user gesture in which both users are moving towards one another to a position within the predetermined user-transfer distance 1003, the apparatus 101 provides for exchange of the audio tracks from one user to the other. Thus, post-sharing, the first user 1001 is presented with the third and fourth audio tracks 203, 204 and the second user 1002 is presented with the first and second audio tracks 201, 202.

To implement such sharing examples, the apparatus 101 may receive signalling to indicate that other users are nearby or that another user is within the user-transfer distance 1003.

The apparatus 101 may provide signalling to indicate which audio tracks are presented to its associated user and/or receive signalling to indicate which audio tracks are presented to the other user. On receipt of signalling indicative of a predetermined sharing gesture being performed by one or both users and the distance between them being within the user-transfer distance 1003, the apparatus 101 may provide for transfer of the one or more shared audio tracks from an apparatus associated with the sharing user to the apparatus associated with the receiving user. In other examples, an identifier may be transferred between the apparatuses, such as a URL, so that the shared audio tracks can be retrieved from a different source. In examples where both users perform a sharing gesture to transfer tracks between them, the apparatus may require the sharing gesture to be performed by the users at the same time or at least within a predefined temporal threshold of one another. The sharing gesture may be the same gesture for both users or a different gesture. In one or more examples, different gestures may determine the direction of the sharing of audio tracks (e.g. from the first to the second or from the second to the first user).

The user-transfer distance may be any appropriate distance such as up to 1 metre, 2 metres, 3 metres or more or less.

FIG. 13 illustrates the apparatus 101 providing for visual presentation of graphics, such as augmented reality graphics using the AR apparatus 104, to indicate to other users how many or which audio tracks are currently presented to the user associated with the apparatus 101. In this example, three augmented reality graphics 1301, 1302 and 1303 are overlaid over a real-world view of the user 1300. Accordingly, the apparatus 101 may provide signalling to the AR apparatus of other users so that the appropriate augmented reality graphics can be presented. Alternatively, the apparatus 101, based on a request from an AR apparatus of another user, may report the audio tracks currently stereophonically/monophonically presented to its user for use in generating the augmented reality graphics. Further the apparatus 101 may, based on one or more reports from other apparatuses provide for display of augmented reality graphics to overlay the user from which the report was received.from the point of view of the user with which the apparatus 101 is associated.

In the previous examples, the apparatus 101 is configured to provide for stereophonic presentation to one of left, right or centre stereo channels, or, as shown in FIG. 9, for stereophonic presentation of four audio tracks each to one of four slots, each slot having a different speaker distribution profile. However, in other examples, the apparatus may determine different audio presentation configurations depending on the number of audio tracks required to be presented as stereophonic/monophonic audio. For example, for one audio track, the apparatus 101 may provide for presentation monophonically such that the audio track is presented to both left and right speakers 401, 402. When the presentation of two audio tracks is required, the apparatus 101 may then switch to providing for stereophonic presentation using two stereo channels—left and right. When the presentation of three audio tracks is required the apparatus may then provide for presentation to three stereo channels (left, right and centre) with one audio track assigned to each stereo channel. When the presentation of four or more audio tracks is required the apparatus may then provide for stereophonic presentation using slots having different speaker distribution profiles. When presentation of more audio tracks is required than there are slots or stereo channels, the apparatus may provide for mixing of audio tracks so that multiple audio tracks may be provided on the same stereo channel or slot. Thus, the apparatus may be adaptive to the number of audio tracks it needs to present monophonically/stereophonically at any one time in terms of the stereo channels/slots used. Alternatively, the apparatus 101 may provide a predetermined number of stereo channels or slots that are individually filled, as required.

FIG. 14 shows a flow diagram illustrating the steps of,
based on 1401 a first audio track of at least one audio track, the first audio track audibly presented to the user as spatial audio such that it is perceived to originate from a particular location and based on the user being within a predetermined distance of the particular location;
providing for 1402 a change in the audible presentation of the first audio track to the user from presentation as spatial audio to presentation as at least one of monophonic and stereophonic audio.

Figure 15:
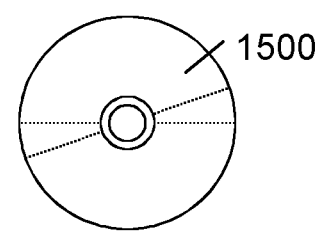
FIG. 15 shows a computer readable medium.

FIG. 15 illustrates schematically a computer/processor readable medium 1500 providing a program according to an example. In this example, the computer/processor readable medium is a disc such as a digital versatile disc (DVD) or a compact disc (CD). In some examples, the computer readable medium may be any medium that has been programmed in such a way as to carry out an inventive function. The computer program code may be distributed between the multiple memories of the same type, or multiple memories of a different type, such as ROM, RAM, flash, hard disk, solid state, etc.

User inputs may be gestures which comprise one or more of a tap, a swipe, a slide, a press, a hold, a rotate gesture, a static hover gesture proximal to the user interface of the device, a moving hover gesture proximal to the device, bending at least part of the device, squeezing at least part of the device, a multi-finger gesture, tilting the device, or flipping a control device. Further the gestures may be any free space user gesture using the user's body, such as their arms, or a stylus or other element suitable for performing free space user gestures.

The apparatus shown in the above examples may be a portable electronic device, a laptop computer, a mobile phone, a Smartphone, a tablet computer, a personal digital assistant, a digital camera, a smartwatch, smart eyewear, a pen based computer, a non-portable electronic device, a desktop computer, a monitor, a smart TV, a server, a wearable apparatus, a virtual reality apparatus, or a module/circuitry for one or more of the same.

Any mentioned apparatus and/or other features of particular mentioned apparatus may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some examples, a particular mentioned apparatus may be pre-programmed with the appropriate software to carry out desired operations, and wherein the appropriate software can be enabled for use by a user downloading a "key", for example, to unlock/enable the software and its associated functionality. Advantages associated with such examples can include a reduced requirement to download data when further functionality is required for a device, and this can be useful in examples where a device is perceived to have sufficient capacity to store such pre-programmed software for functionality that may not be enabled by a user.

Any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

Any "computer" described herein can comprise a collection of one or more individual processors/processing elements that may or may not be located on the same circuit board, or the same region/position of a circuit board or even the same device. In some examples one or more of any mentioned processors may be distributed over a plurality of devices. The same or different processor/processing elements may perform one or more functions described herein.

The term "signalling" may refer to one or more signals transmitted as a series of transmitted and/or received electrical/optical signals. The series of signals may comprise one, two, three, four or even more individual signal components or distinct signals to make up said signalling. Some or all of these individual signals may be transmitted/received by wireless or wired communication simultaneously, in sequence, and/or such that they temporally overlap one another.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/examples may consist of any such individual feature or combination of features. In view of the foregoing description it will be evident to a person skilled in the art that various modifications may be made within the scope of the disclosure.

While there have been shown and described and pointed out fundamental novel features as applied to examples thereof, it will be understood that various omissions and substitutions and changes in the form and details of the devices and methods described may be made by those skilled in the art without departing from the scope of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or examples may be incorporated in any other disclosed or described or suggested form or example as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus comprising
at least one processor; and
at least one non-transitory memory including computer program code;
the at least one non-transitory memory and the computer program code configured to, with the at least one processor, cause the apparatus at least to perform:
based on a first audio track of at least one audio track, audibly present the first audio track to a user as spatial audio such that it is perceived to originate from a particular location;
based on the user being within a predetermined distance of the particular location, provide for a change in the audible presentation of the first audio track to the user from presentation as spatial audio to presentation as a second type of audio, wherein the second type of audio is at least partially different from spatial audio; and
continue to provide audible presentation of the first audio track to the user as the second type of audio when the user moves away from the particular location; and
provide for a change in the audible presentation of the first audio track to the user from presentation as the second type of audio to presentation as spatial audio based, at least partially, on a determination to provide for a change in an audible presentation of a second audio track to the user from presentation as spatial audio to presentation as the second type of audio.

2. The apparatus of claim 1, wherein audibly presenting the first audio track as spatial audio comprises the at least one non-transitory memory and the computer program code are configured to, with the at least one processor, cause the apparatus to process the first audio track using one or more of:
a head-related-transfer-function filtering technique; or
a vector-base-amplitude panning technique.

3. The apparatus of claim 1, wherein providing for the change to the second type of audio is further based on the user providing a predefined user input.

4. The apparatus of claim 1, wherein the particular location and a location of the user are defined relative to one of:
a virtual space, the virtual space comprising a virtual environment in which a representation of the user is free to move; or
a real-world space in which the user is located.

5. The apparatus of claim 1, wherein the user is associated with at least two speakers, the at least two speakers located on opposite sides of a head of the user to provide audio to different ears and wherein, based on a side of the head of the user that is closest to the particular location, at least within a predetermined time window prior to provision of the change, the at least one non-transitory memory and the computer program code are further configured to, with the at least one processor:
define, at least in part, which one of the at least two speakers the first audio track is provided to, for audible presentation, with a greater volume than another one of the at least two speakers when the apparatus provides for the change in the audible presentation of the first audio track to presentation as the second type of audio.

6. The apparatus of claim 1, wherein providing for the change in the audible presentation of the first audio track comprises the at least one non-transitory memory and the computer program code are further configured to, with the at least one processor, cause the apparatus to provide for:
audible presentation of the first audio track with a first speaker distribution profile; and
audible presentation of a third audio track with a second speaker distribution profile different to the first speaker distribution profile;
wherein the first and second speaker distribution profiles define at least which of a first speaker and a second speaker the first audio track is presented to and which of the first speaker and the second speaker the third audio track is presented to, wherein the first and second speakers are located on opposite sides of a head of the user to provide audio to a left and a right ear of the user.

7. The apparatus of claim 6, wherein:
the second speaker distribution profile is the same as a speaker distribution profile used to present the third audio track prior to audible presentation of the first audio track as the second type of audio; or
the second speaker distribution profile is different from the speaker distribution profile used to present the third audio track prior to audible presentation of the first audio track as the second type of audio.

8. The apparatus of claim 1, wherein a predetermined audio track limit of at least two is provided that limits the number of audio tracks that can be presented to the user as the second type of audio at any one time; and wherein
based on the user being presented with a maximum number of audio tracks as the second type of audio that meets the audio track limit, and based on the provision of the change in the audible presentation of the first audio track, the at least one non-transitory memory and the computer program code are configured to, with the at least one processor, cause the apparatus to:
provide for the ceasing of the audible presentation as the second type of audio of at least one of the maximum number of audio tracks.

9. The apparatus of claim 1, wherein the at least one non-transitory memory and the computer program code are configured to, with the at least one processor, cause the apparatus to maintain a list of audio tracks for presentation to the user as the second type of audio at any one time, and the audio tracks in the list are user selectable such that on selection of one of the audio tracks in the list, wherein the at least one non-transitory memory and the computer program code are configured to, with the at least one processor, cause the apparatus to provide for audible presentation of the selected audio track without unselected audio tracks in the list as the second type of audio.

10. The apparatus of claim 1, wherein based on signaling indicative of a detection of a predetermined head movement of the user, the at least one non-transitory memory and the computer program code are configured to, with the at least one processor, cause the apparatus to provide for ceasing of audible presentation of the first audio track presented to the user as the second type of audio.

11. The apparatus of claim 1, wherein the first audio track comprises one of a plurality of audio tracks, wherein the at least one non-transitory memory and the computer program code are configured to, with the at least one processor, cause the apparatus to:
audibly present the plurality of audio tracks to the user as spatial audio such that each is perceived to originate from a respective particular location, and
based on a user input indicative of a selection of the plurality of audio tracks, provide for a change in the audible presentation of the plurality of audio tracks to the user from presentation as spatial audio to presentation as the second type of audio.

12. The apparatus of claim 1, wherein based on the user being within a predetermined user-transfer distance of a second user, the at least one non-transitory memory and the computer program code are configured to, with the at least one processor, cause the apparatus to provide for generation of signaling to provide for one or more of:
presentation of a shared audio track to the second user as the second type of audio, the shared audio track comprising an audio track presented to the user as the second type of audio; or
presentation of the shared audio track to the user as the second type of audio, the shared audio track comprising an audio track presented to the second user as the second type of audio.

13. The apparatus of claim 12, wherein the provision of the signaling is further based on a user gesture from one or both of the user or the second user.

14. The apparatus of claim 1, wherein the second type of audio comprises one of monophonic or stereophonic audio.

15. A method comprising:
based on a first audio track of at least one audio track, audibly presenting the first audio track to a user as spatial audio such that it is perceived to originate from a particular location;
based on the user being within predetermined distance of the particular location, providing for a change in the audible presentation of the first audio track to the user from presentation as spatial audio to presentation as a second type of audio, wherein the second type of audio is at least partially different from spatial audio;
continuing to provide audible presentation of the first audio track to the user as the second type of audio when the user moves away from the particular location; and
providing for a change in the audible presentation of the first audio track to the user from presentation as the second type of audio to presentation as spatial audio, such that the first audio track is perceived to originate from a second location based, at least partially, on a determination to provide for a change in an audible presentation of a second audio track to the user from presentation as spatial audio to presentation as the second type of audio.

16. The method of claim 15, wherein the audibly presenting of the first audio track as spatial audio comprises processing the first audio track using one or more of:
a head-related-transfer-function filtering technique; or
a vector-base-amplitude panning technique.

17. The method of claim 15, wherein the provision of the change to the second type of audio is further based on the user providing a predefined user input.

18. The method of claim 15, wherein the particular location and a location of the user are defined relative to one of:

a virtual space, the virtual space comprising a virtual environment in which a representation of the user is free to move; or a real-world space in which the user is located.

19. The method of claim 15, wherein the user is associated with at least two speakers, the at least two speakers located on opposite sides of a head of the user to provide audio to different ears and wherein, based on a side of the head of the user that is closest to the particular location, at least within a predetermined time window prior to provision of the change, defining, at least in part, which one of the at least two speakers the first audio track is provided to, for audible presentation, with a greater volume than another one of the at least two speakers when providing for the change in the audible presentation of the first audio track as the second type of audio.

20. The method of claim 15, wherein the providing for the change in the audible presentation of the first audio track further comprises providing for:

audible presentation of the first audio track with a first speaker distribution profile; and audible presentation of a third audio track with a second speaker distribution profile different to the first speaker distribution profile;

wherein the first and second speaker distribution profiles define at least which of a first speaker and a second speaker the first audio track is presented to and which of the first speaker and the second speaker the third audio track is presented to, wherein the first and second speakers are located on opposite sides of a head of the user to provide audio to left and right ears of the user.

21. A non-transitory computer readable medium comprising program instructions stored thereon for performing at least the following:

based on a first audio track of at least one audio track, audibly presenting the first audio track to the user as spatial audio such that it is perceived to originate from a particular location;

based on the user being within a predetermined distance of the particular location, providing for a change in the audible presentation of the first audio track to the user from presentation as spatial audio to presentation as a second type of audio, wherein the second type of audio is at least partially different from spatial audio;

continuing to provide audible presentation of the first audio track to the user as the second type of audio when the user moves away from the particular location; and providing for a change in the audible presentation of the first audio track to the user from presentation as the second type of audio to presentation as spatial audio, such that the first audio track is perceived to originate from a second location based, at least partially, on a determination to provide for a change in an audible presentation of a second audio track to the user from presentation as spatial audio to presentation as the second type of audio.

* * * * *